(12) United States Patent
Abe et al.

(10) Patent No.: US 9,690,182 B2
(45) Date of Patent: Jun. 27, 2017

(54) MAGNET SCREEN DEVICE

(71) Applicant: IZUMI-COSMO COMPANY, LIMITED, Osaka (JP)

(72) Inventors: Teruyuki Abe, Tokyo (JP); Tomoyuki Takemura, Tokyo (JP); Kazuharu Seki, Tokyo (JP)

(73) Assignee: Izumi-Cosmo Company, Limited, Osaka (JP)

( * ) Notice: Subject to any disclaimer, the term of this patent is extended or adjusted under 35 U.S.C. 154(b) by 0 days.

(21) Appl. No.: 15/064,886

(22) Filed: Mar. 9, 2016

(65) Prior Publication Data
US 2016/0266481 A1     Sep. 15, 2016

(30) Foreign Application Priority Data

Mar. 10, 2015  (JP) ................................. 2015-047415

(51) Int. Cl.
*G03B 21/58*     (2014.01)
*G09F 7/04*      (2006.01)

(52) U.S. Cl.
CPC .............. *G03B 21/58* (2013.01); *G09F 7/04* (2013.01)

(58) Field of Classification Search
CPC .................................. G03B 21/58; G09F 7/04
USPC .................... 359/443, 449, 461; 40/309, 600
See application file for complete search history.

(56) References Cited

U.S. PATENT DOCUMENTS

| | | | | |
|---|---|---|---|---|
| 5,353,152 A | * | 10/1994 | Realmuto | G03B 21/58 160/120 |
| 2004/0006902 A1 | * | 1/2004 | Zarelius | G09F 15/00 40/600 |
| 2013/0027771 A1 | * | 1/2013 | Aoki | G03B 21/58 359/461 |
| 2014/0133019 A1 | * | 5/2014 | Mullet | E06B 9/62 359/461 |
| 2015/0338730 A1 | * | 11/2015 | Henson | G03B 21/58 359/461 |

FOREIGN PATENT DOCUMENTS

| | | | |
|---|---|---|---|
| JP | 62157022 A | * | 7/1987 |
| JP | 2011-17957 A | | 1/2011 |
| JP | 2014-03551 A | | 1/2014 |

* cited by examiner

*Primary Examiner* — Christopher Mahoney
(74) *Attorney, Agent, or Firm* — Renner, Otto, Boisselle & Sklar, LLP

(57) ABSTRACT

There is provided a magnet screen device capable of satisfactorily displaying an image projected from a projector even at an edge portion of a screen sheet thereof. The magnet screen device comprises a screen sheet having a projection surface and a magnet surface opposed to the projection surface, and a roll part for rolling up the screen sheet. In non-use state of the device, the screen sheet is in a rolled-up position on the roll part such that the magnet surface is situated on the inside with respect to the projection surface in the rolled-up screen sheet.

10 Claims, 15 Drawing Sheets

(A) Prior Art (B) Present Invention (A) Prior Art (B) Present Invention (A) Prior Art (B) Present Invention Front side of sheet Back side of sheet Present Invention

MAGNET SCREEN DEVICE

TECHNICAL FIELD

The present invention relates to a screen device. In particular, the present invention relates to a magnet screen device in which a screen sheet for projected images can be extended and subsequently held on a mount plane by use of a magnet.

BACKGROUND ART

Screen devices have been used for a presentation in a meeting, an academic conference, a lecture meeting and an exhibition. In recent year, a projection-screen device for a home theater has been increasingly used at home. The screen device in general is used with a projector (i.e., a projection equipment or projection-display device) wherein an image from the projector is projected onto a screen sheet of the screen device.

As the screen device, there has been provided a magnet-type device wherein the screen sheet thereof is extendable and can be held with its extended state by use of a magnet. Upon using of the device, the screen sheet thereof is extended and the extended sheet is held on a mount plane by a magnetic force of the magnet.

PRIOR ART DOCUMENTS

Patent Documents

Patent Document 1: JP2011-17957A1
Patent Document 2: JP2014-03551A1

DISCLOSURE OF THE INVENTION

Problems to be Solved by the Invention

As a result of extensive studies by the inventors, they have found that the magnet screen device still has room for improvement. Specifically, there is adversely occurred a phenomenon of "curling" after the screen sheet is rolled down to be extended, followed by being held on the mount plane. The curling makes it impossible for the image projected from the projector to be satisfactorily displayed on the sheet. In particular, the curling occurs at longitudinal edges (i.e., longer edges) of the extended and held screen sheet on the vertical plane. As shown in FIG. 15, each of the longitudinal edges has been locally curved toward the front side (i.e., toward "projector side"), and thereby the curling is generated. The curling leads to a partial distortion of the image projected thereon.

While not wishing to be bound by any theory, the curling is due to the fact that the rolled/wound up of the screen sheet during a non-use of the device causes its rolled/wound-shape to be more or less retained even after the screen sheet is rolled/wound down to be extended. That is, the screen sheet under long time of rolled-up stress tends to take its rolled-up form even after the screen sheet is rolled down to be extended for its use, which leads to the partial curve of the longitudinal edges of the extended screen sheet, the partial curve being toward the front side, i.e., toward the projector. As can been seen from FIG. 15, the curling tends to occur more largely at the middle portion of the longitudinal edge of the extended screen sheet. In a case where the screen sheet is rolled down to be extended in a horizontal direction, the curling at the upper longitudinal edge of the screen sheet tends to be larger than that of the lower longitudinal edge of the screen sheet since the gravity more greatly affects the former than the latter.

The curling is regarded as particularly undesirable phenomenon when the screen device is used with "short focal-length projector" and "extremely short focal-length projector" wherein a projection from the projector is performed with short focal length. Specifically, the presence of the curling causes a risk for the occurrence of a shade in the image projected onto the screen sheet.

Under these circumstances, the present invention has been created. That is, the present invention is directed to provide a magnet screen device which is capable of satisfactorily displaying an image projected from a projector even at an edge portion of the screen sheet thereof.

Means for Solving the Problems

The present invention provides a magnet screen device comprising:
  a screen sheet having a projection surface and a magnet surface opposed to the projection surface; and
  a roll part for rolling up the screen sheet,
  wherein, in non-use state of the device, the screen sheet is in a rolled-up position on the roll part such that the magnet surface is situated on the inside with respect to the projection surface.

In one preferred embodiment, the screen sheet is rolled up or down at a distal roll side of the roll part under such a mounted state of the device that the roll part of the mounted device has a proximal roll side and the distal roll side opposed to the proximal roll side, the proximal roll side being located proximally with respect to a device-mount plane, the distal roll side being located distally with respect to the device-mount plane. In other words, the screen sheet is extended to be away from the distal roll side of the roll part upon rolling down of the sheet, and also the screen sheet is fed to the distal roll side of the roll part to be rolled upon rolling up of the sheet, the distal roll side being located distally with respect to the device-mount plane.

In one preferred embodiment, a starting point for rolling up or down of the screen sheet is above the upper half of the roll part under such a mounted state of the device that the magnet screen device is positioned on the device-mount plane with the roll part of the device being located above the device-mount plane whereas the device-mount plane being located below the roll part. In other words, when the magnet screen device is mounted on the device-mount plane such that the roll part of the device is positioned above the device-mount plane (i.e., the device-mount plane is positioned below the roll part), the starting point for the rolling up or down of the screen sheet is located above the upper half of the roll part (especially, the upper half of the body of the roll part).

In one preferred embodiment, the magnet screen device further comprises an elongated part capable of making contact with the screen sheet upon rolling up or down of the screen sheet. It is preferred that the elongated part is capable of making direct contact with the projection surface of the rolled-up or down screen sheet. In particular, it is preferred that the elongated part is rotatable due to a sliding contact of the rolled up or down screen sheet with the elongated part. It is also preferred that the elongated part has a hollow structure.

In one preferred embodiment, the magnet screen device further comprises a casing for housing the screen sheet and the roll part. It is preferred that the casing has an opening for the rolling up or down of the screen sheet. It is also preferred that the elongated part is positioned at the opening. That is, the elongated part is preferably located adjacent to a casing port for the rolling up or down of the screen sheet.

In one preferred embodiment, the screen sheet is at least composed of a resin layer and a magnet layer. That is, the screen sheet includes a layered-magnet portion, proving the magnet surface of the sheet. It is preferred in this embodiment that, in non-use state of the device, the screen sheet is in the rolled-up position on the roll part such that the magnet layer is situated on the inside with respect to the resin layer.

In one preferred embodiment, the magnet screen device is a portable device. That is, the magnet screen device as a whole is easy to carry around.

In one preferred embodiment, the roll part is a spring roll. In other words, the roll part is provided with a spring for forcing the roll part to be rotated for rolling up of the screen sheet.

Effects of the Invention

In accordance with the present invention, the rolled-down screen sheet can be held on a mount plane with no "curling" occurring when the magnet screen device is used (see FIG. 14). This allows an image projected from a projector to be satisfactorily displayed on the screen sheet even at the edge of the screen sheet. In other words, the image projected from the projector is prevented from being distorted at the edge of the screen. No "curling" also means that a satisfactory projection can be performed with no "shading".

The present invention is based on such a reverse concept that the rolling-up position of the screen sheet onto the roll part (i.e., the retained rolling-up shape of the screen sheet) is positively utilized for preventing the occurrence of the curling.

In the magnet screen device of the present invention, the screen sheet is in rolled up position in non-use state of the device such that the magnet surface is situated on the inner side with respect to the projection surface in the screen sheet. This can force the longitudinal edge of the screen sheet to be partially curved after the rolling down of the sheet, but such partial curve is toward the mount plane (i.e., toward the opposite to the front side), which can cause the screen sheet to stick to the mount plane. The retained rolled-up shape of the screen sheet, if any, can contribute to the sticking action of the screen sheet with respect to the mount plane, which leads to a satisfactory holding of the extended sheet with no "curling". In other words, as shown in FIG. 14, the rolled down screen sheet of the magnet screen device according to the present invention can be wholly mounted on the plane with a taut state of the sheet, especially with the edge portions of the screen sheet being taut.

MODES FOR CARRYING OUT THE INVENTION

Figure 1:
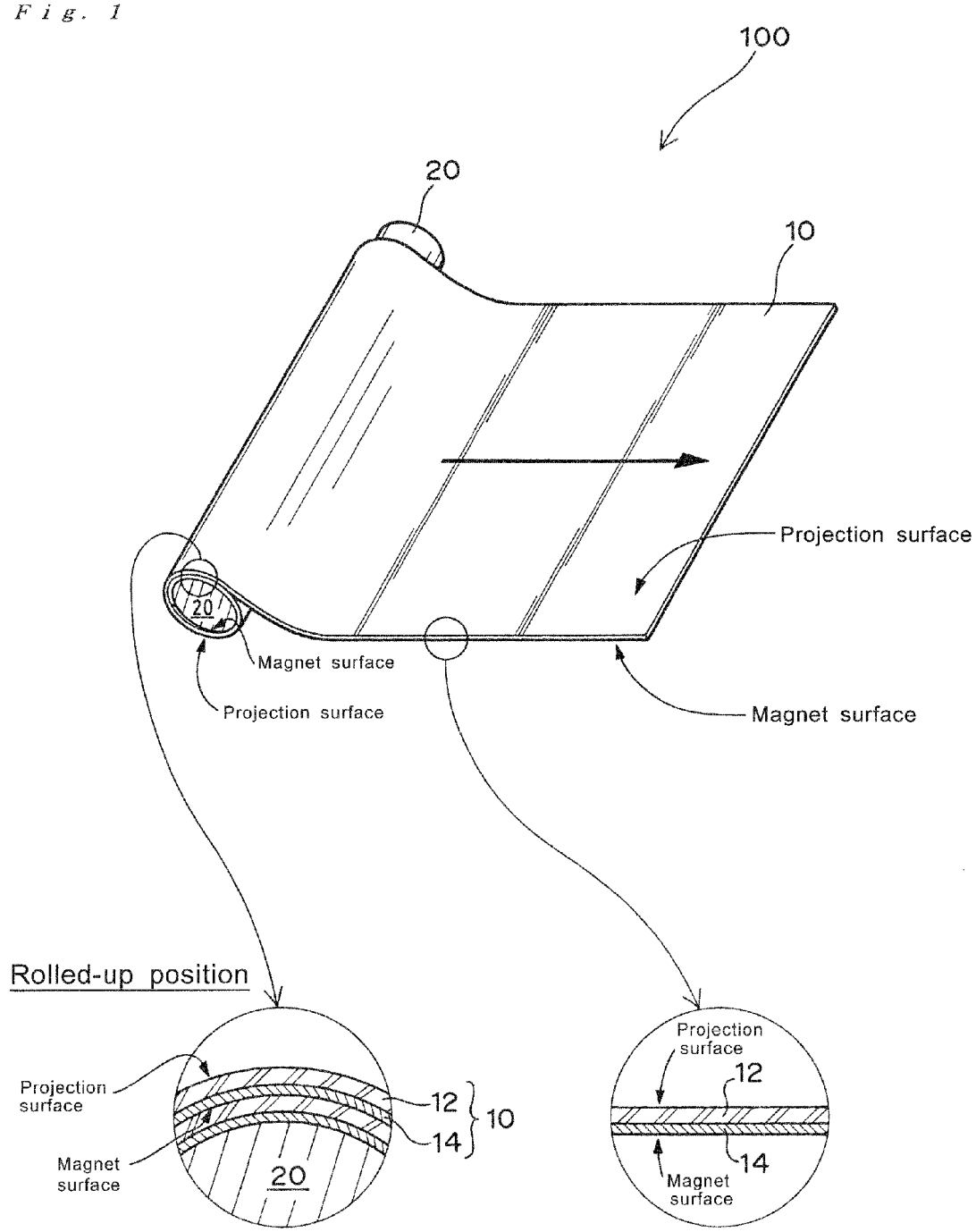
FIG. 1 is a schematic view of the magnet screen device according to the present invention, showing the concept of the present invention.

A magnet screen device according to the present invention will be described in detail with reference to the accompanying drawings. It should be noted that various parts or elements regarding the present invention are schematically shown in the drawings wherein their dimensional proportions and their appearances are not necessarily real ones, and are merely illustrated for purpose of making it easy to understand the present invention.

The basic structure of a magnet screen device 100 according to the present invention is shown in FIG. 1. The magnet screen device 100 of the present invention at least comprises a screen sheet 10 and a roll part 20.

The screen sheet 10 is a sheet for displaying an image which is projected from a projector. Because of "sheet", the screen sheet 10 can be flexible. In particular, the flexibility of the screen sheet 10 is such that the sheet can be suitably rolled up. The form of the screen sheet 10 is rectangular as a whole. That is, the screen sheet 10 has a band-like form as a whole. In non-use state of the magnet screen device, the screen sheet is kept in its rolled-up position.

The screen sheet 10 has a projection surface and a magnet surface. In this regard, the opposed principal surfaces of the screen sheet 10 correspond to the projection surface and the magnet surface. The projection surface is a sheet surface for displaying an image projected from the projector. While on the other hand, the magnet surface is a sheet surface which undergoes a contact with a vertical plane (e.g., wall surface) upon the use of the device. Based on the use of the magnet screen device, the projection surface corresponds to "front surface" of the sheet, whereas the magnet surface corresponds to "back surface" of the sheet.

As shown in a cross-sectional view of FIG. 1, the screen sheet 10, which has the projection surface and the magnet surface, may at least comprises a resin layer 12 and a magnet layer 14, for example. In this case, the resin layer 12 positioned at front side of the sheet provides the projection surface, whereas the magnet layer 14 positioned at back side of the sheet provides the magnet surface. The resin layer 12 may be made of a resin material which is used in a conventional screen sheet. While on the other hand, the magnet layer 14, which exhibits a magnetic force, may be made of a base material (e.g., resin material and/or rubber material) and a magnet powder contained therein.

The roll part 20 serves as a core for rolling up of the screen sheet 10. In other words, the roll part 20 is a part for holding the screen sheet in the rolled-up position at a point in time during the non-use state of the magnet screen sheet 100. One of the shorter edges of the screen sheet 10 is attached to the body of the roll part 10. Based on the attached edge of the screen sheet 10, the screen sheet 10 can be rolled up onto the roll part 20. The whole shape of the roll part 20 is not limited to the specific one. For example, the whole shape of the roll part 20 may be columnar shape. That is, the roll part 20 may have cylindrical shape which longitudinally extends along the rotation axis thereof.

For example, the roll part 20 is equipped with a spring. The spring serves to keep providing the roll part with its rotation force, and thereby allowing the screen sheet 10 to be rolled up onto the roll part. In this regard, the roll part 20 may be a spring roll. In a case of the spring roll, the spring force of the roll part (i.e., a rotation force of the roll part attributed thereto) allows the screen sheet 10 to be held in the rolled up position on the roll part 20. Upon the use of the magnet screen device, the screen sheet 10 is rolled down against the spring force of the roll part 20. The spring of the spring roll may be a coil spring. It is preferred that the coil spring is a long coil spring provided by transforming a small steel wire rod into a spiral form.

The magnet screen device 100 according to the present invention is characterized by a rolling up position of the screen sheet during non-state of the device (and the associated rolling up or down of the screen sheet when the device is used). As shown in FIG. 1, in non-use state of the magnet screen device 100, the screen sheet 10 is in the rolled-up position on the roll part 20 such that the magnet surface is situated or positioned on the inside with respect to the projection surface in the screen sheet. Namely, in the rolled-up position or state of the screen sheet 10 on the roll part 20, the magnet surface is located more proximally with respect to the roll part whereas the projection surface is located more distally with respect to the roll part. In a case where a layer with the projection surface is the resin layer 12, and a layer with the magnet surface is the magnet layer 14, the screen sheet 10 is in the rolled-up position on the roll part 20 such that the magnet layer 14 is situated or positioned on the inside with respect to the resin layer 12 in non-use state of the device.

Figure 2:
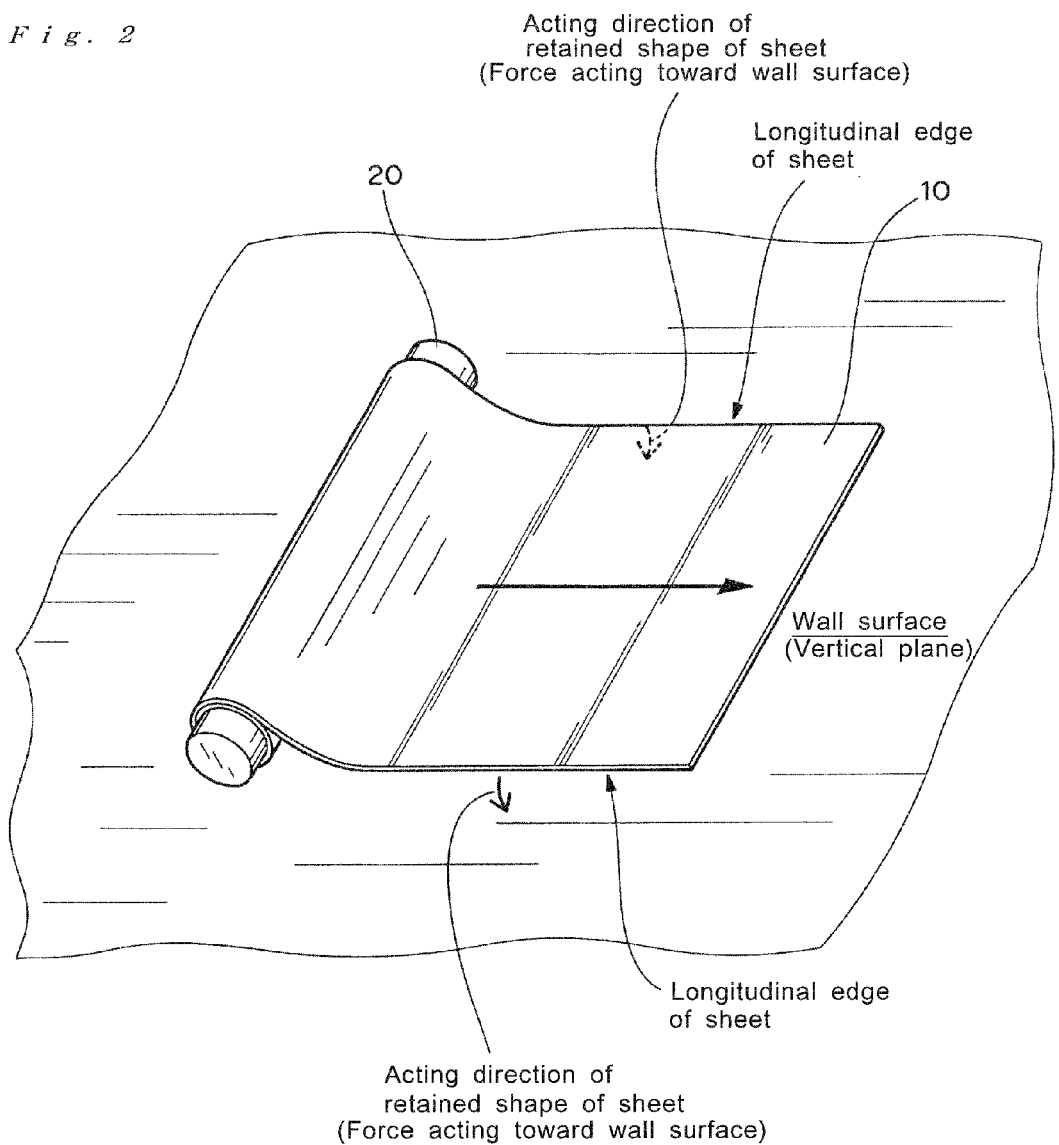
FIG. 2 is a schematic view of the magnet screen device mounted on a mount plane (especially on the vertical plane) according to the present invention.
Figure 14:
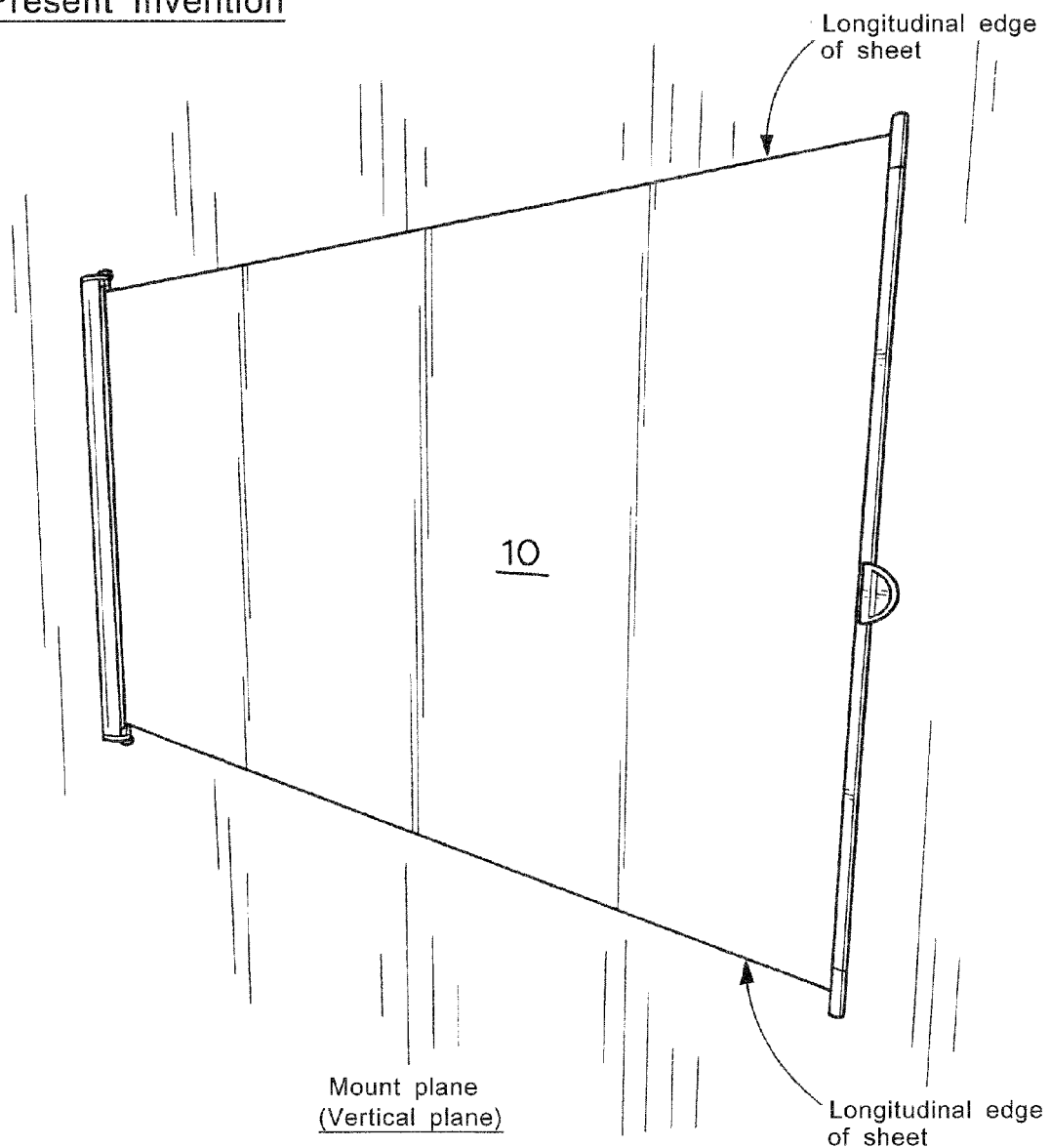
FIG. 14 is a schematic view of the use of the magnet screen device according to an embodiment of the present invention, showing the extended screen sheet being held on the plane with a taut state of the sheet.
Figure 15:
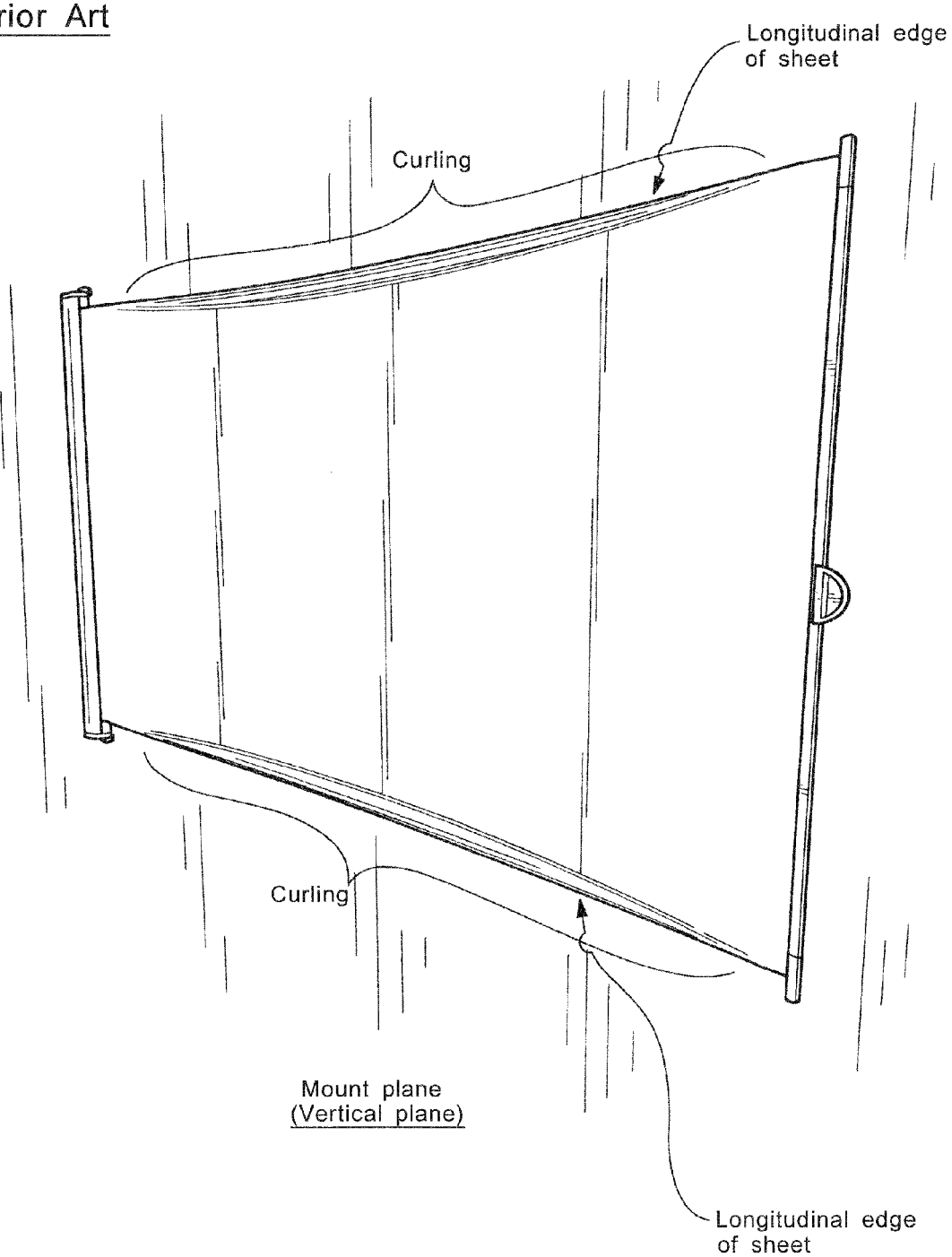
FIG. 15 is a schematic view of use of the magnet screen device of prior art, showing the extended screen sheet being held on the mount plane.

In the magnet screen device 100 with the screen sheet 10 being in the rolled-up position on the roll part 20, the extended rolled-down screen sheet can be wholly held on the device-mount plane with the edges of the sheet (especially "longitudinal edges of the sheet") being satisfactorily taut. See FIGS. 2 and 14. The rolled-down screen sheet tends to retain its rolling-up shape which is attributed to the kept rolled-up position of the screen sheet on the roll part. The present invention makes positive use of the retained shape at a point in time after the screen sheet is rolled down. Specifically, due to such a rolled-up position of the screen sheet on the roll part that the magnet is situated on the inside with respect to the projection surface, the retained shape of the longitudinal edges of the sheet is oriented toward the device-mount plane. This can cause the longitudinal edges of the screen sheet to stick to the device-mount plane. As such, the rolled-down and extended screen sheet can be wholly held on the device-mount plane with the edges of the sheet (especially "longitudinal edges of the sheet") being satisfactorily taut.

Figure 3:
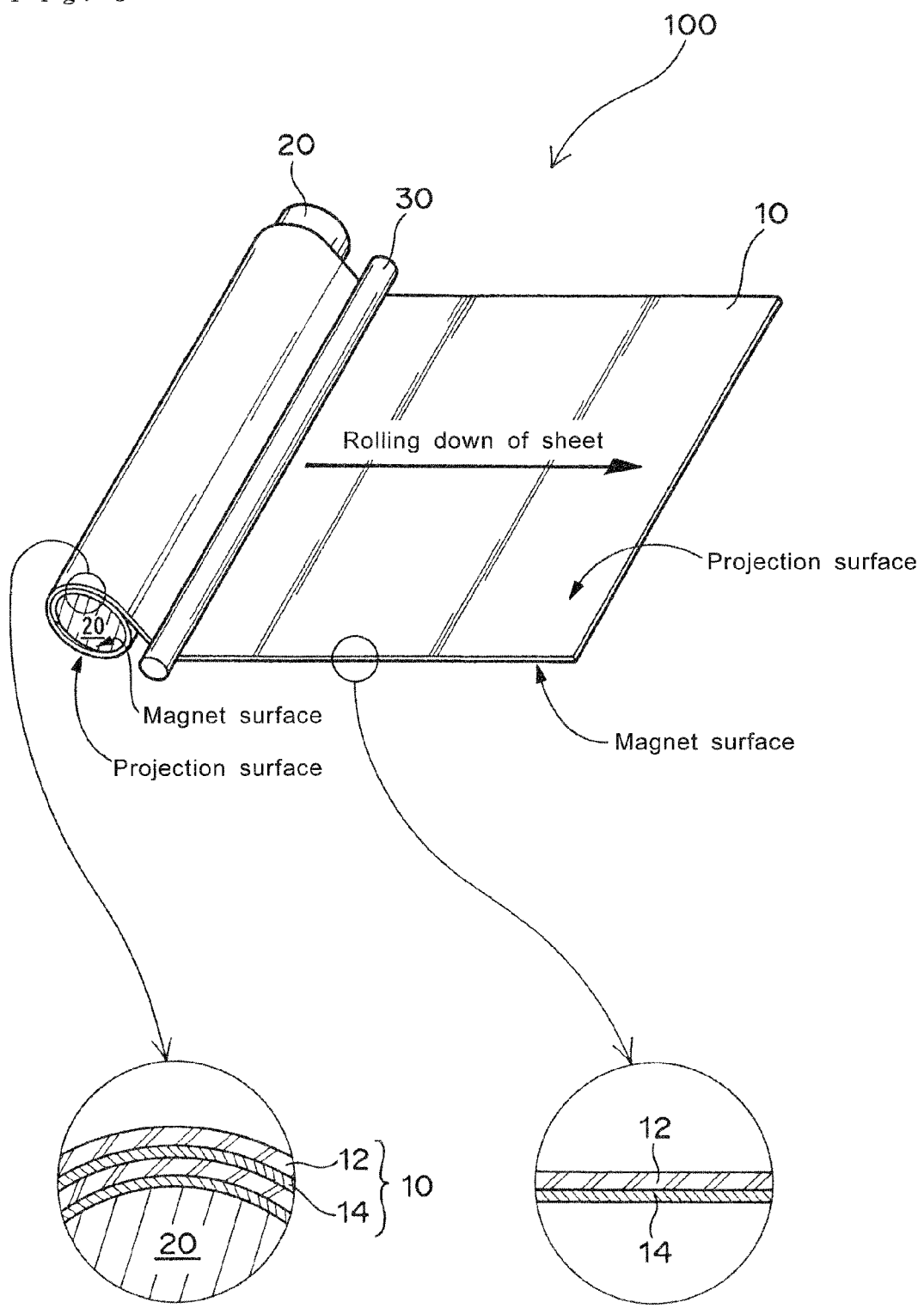
FIG. 3 is a schematic view of the basic structure of the magnet screen device equipped with an elongated part according to the present invention.

As shown in FIG. 3, it is preferred that the magnet screen device of the present invention further comprises an elongated part 30 which is capable of making contact with the screen sheet 10. That is, it is preferable to further provide the elongated part 30 which is capable of making contact with the rolled-up or down screen sheet 10 upon using of the magnet screen device. As shown in FIG. 3, the elongated part 30 is located adjacent to the roll part 20 (where the spaced distance between the elongated part and the roll part is in the range of about 1 cm to about 15 cm, for example), and thereby making it possible to put a local pressure on the rolled-up or down screen sheet 10. In particular, the elongated part 30 is preferably located adjacent to the roll part 20 to put the local pressure on the screen sheet 10 from the side of the projection surface, i.e., the resin-layer side of the screen sheet. As can been seen from FIGS. 3, 4 and 6, the elongated part 30 is particularly preferably located adjacent to a proximal-half of the roll part under such an assumption that the roll part is divided into two halves by a plane parallel to the device-mount plane, and the proximal-half is positioned more proximally to the device-mount plane than the other half. This means that the elongated part 30 is preferably located adjacent to the lower half of the roll body. In other words, it is preferred that the elongated part 30 is positioned nearer to the device-mount plane with respect to the half-dividing plane of the roll part, the dividing plane being parallel to the device-mount plane.

(Characterizing Feature of the Present Invention)

Now, the characterizing feature of the present invention will be described in more detail. The magnet screen device of the present invention is characterized in that the screen sheet 10 is in the rolled-up position on the roll part 20 such that the magnet surface is situated on the inside with respect to the projection surface. That is, the roll part 20 such that the magnet surface is situated on the inside with respect to the projection surface in the rolled-up position of the screen sheet. In a case where a layer with the projection surface is the resin layer 12, and a layer with the magnet surface is the magnet layer 14, the screen sheet 10 is in the rolled-up position on the roll part 20 such that the magnet layer 14 is situated on the inside with respect to the resin layer 12 in non-use state of the device. That is, the magnet layer 14 is situated on the inside with respect to the resin layer 12 in the rolled-up position of the screen sheet.

Figure 4:
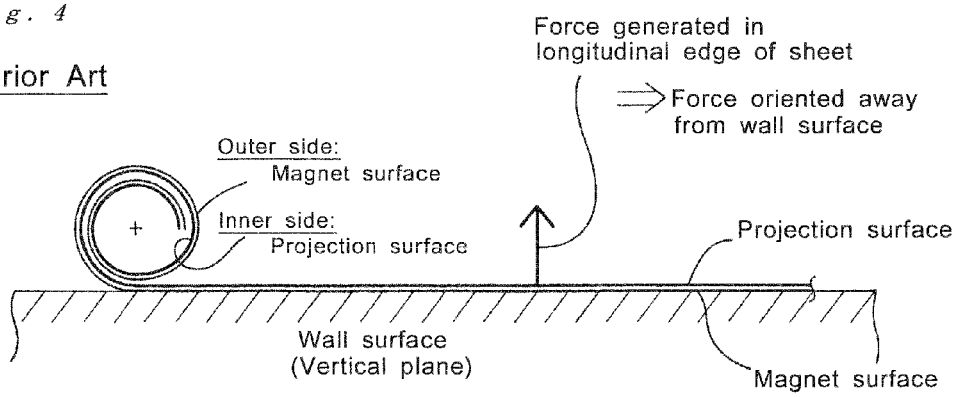
FIG. 4 is a schematic view of the difference between "screen device structure of the present invention" and "screen device structure of the prior art".
Figure 4:
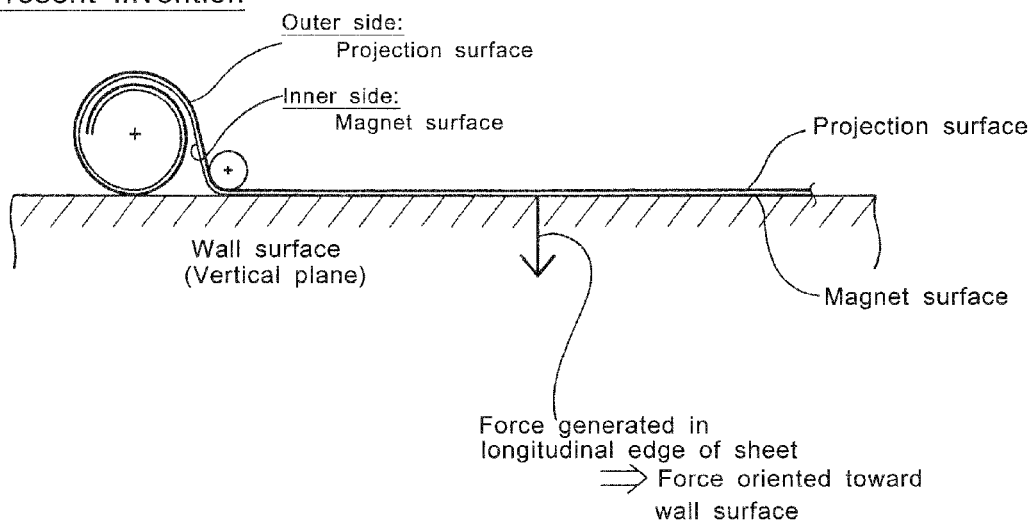
Figure 5:
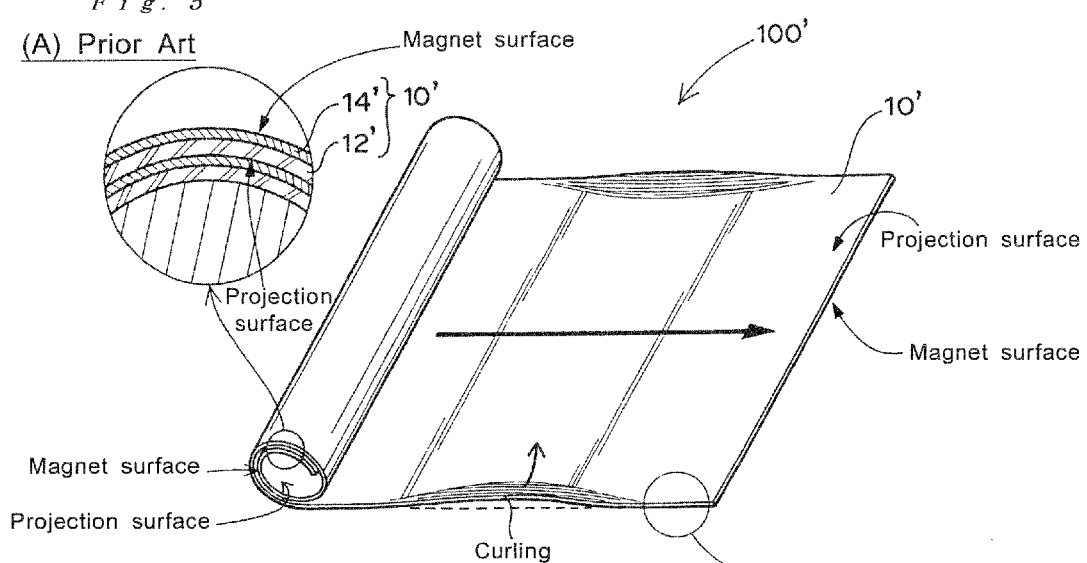
FIG. 5 is a schematic view of the difference between "screen device structure of the present invention" and "screen device structure of the prior art".
Figure 5:
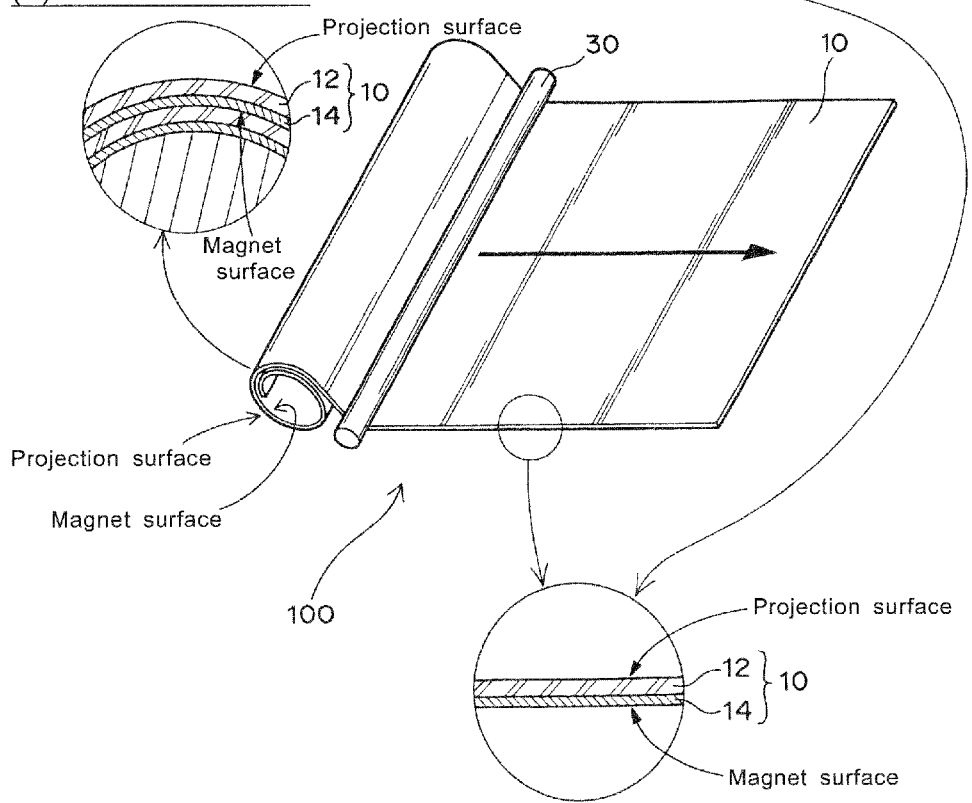

The difference between "screen device structure of the present invention" and "screen device structure of the prior art" will be described with reference to FIGS. 4 and 5. FIGS. 4(A) and 5(A) show schematic cross-sectional views of the structure regarding the prior art wherein the screen sheet has been partially rolled down in the magnet screen device of the prior art. While on the other hand, FIGS. 4(B) and 5(B) show schematic cross-sectional views of the structure regarding the present invention wherein the screen sheet has been partially rolled down in the magnet screen device of the present invention.

As shown in FIGS. 4(A) and 5(A), the magnet screen device of the prior art is configured such that the projection surface is situated on the inside with respect to the magnet surface in the rolled-up position of the screen sheet. In the magnet screen device of the prior art, the screen sheet is rolled down for its use from a point adjacent to the wall surface. In contrast, as shown in FIGS. 4(B) and 5(B), the magnet screen device of the present invention is configured such that the magnet surface is situated on the inside with respect to the projection surface in the rolled-up position of the screen sheet. In the magnet screen device of the present invention, the screen sheet is rolled down for its use from a point away from the wall surface, the point being farther away from the wall point than that of the prior art. As such, the rolling-up position of the screen sheet is mutually in reverse between the prior art and the present invention.

As for the magnet screen device of the prior art, the screen sheet tends to retain its rolled-up form, causing the occurrence of the curling at the longitudinal edges of the extended screen sheet. Especially as shown in FIG. 4(A), the magnet screen device of the prior art is such that the force oriented away from the wall surface (vertical plane) i.e., in the wall-pressing direction is generated at the longitudinal edges of the extended screen sheet. While on the other hand, especially as shown in FIG. 4(B), the magnet screen device of the present invention is such that the force generated at the longitudinal edges of the sheet is oriented toward the wall surface (vertical surface), i.e., in the wall-pressing direction. This allows the longitudinal edges of the screen sheet to stick to the mount plane, leading to the taut state of the extended screen sheet with no "curling" thereof. In other words, the present invention makes it possible to satisfactorily keep the whole of the screen sheet on the device-mount plane with the edge (especially "longitudinal edges") of the sheet being satisfactorily taut.

Figure 6:
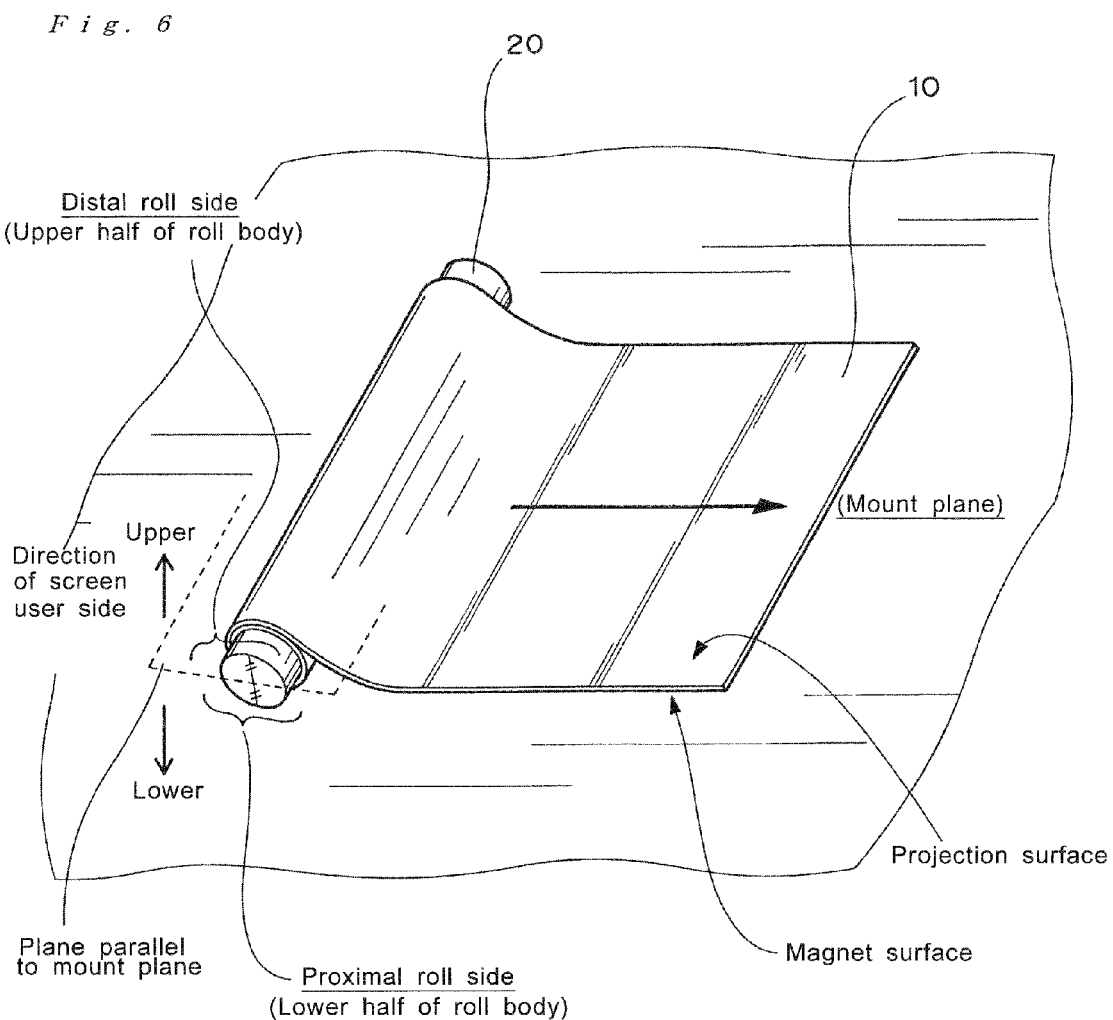
FIG. 6 is a schematic view of the structure of the magnet screen device according to the present invention, especially showing "proximal roll side" and "distal roll side".
Figure 7:
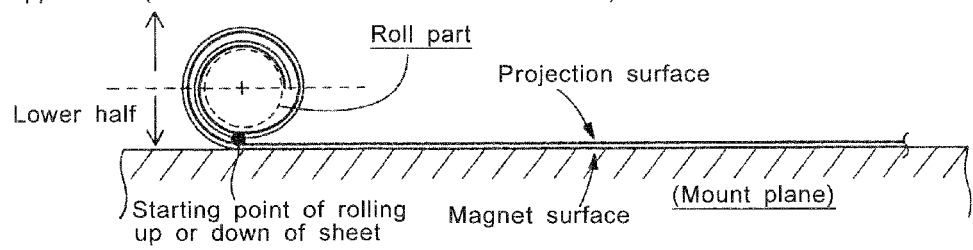
FIG. 7 is a schematic view of the magnet screen device according to the present invention, especially showing a starting point for rolling up or down of the screen sheet.
Figure 7:
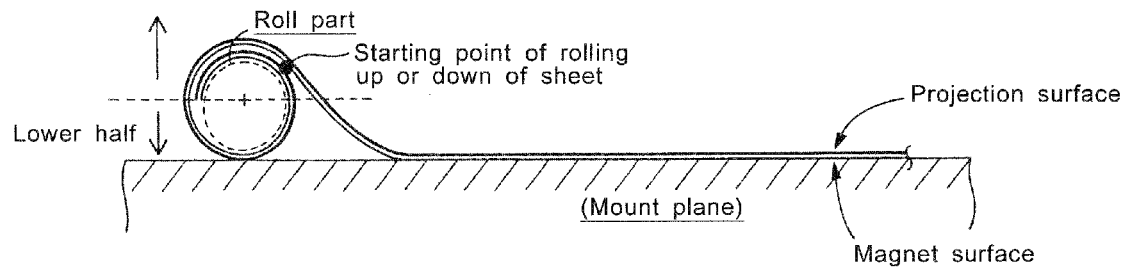

The configuration of the magnet screen device according to the present invention will be hereinafter described in more detail. The magnet screen device of the present invention is such that the rolling up or down of the screen sheet is done from the "distal" side with respect to the device-mount plane. More specifically, as shown in FIG. 6, the screen sheet is rolled up or down at a distal roll side of the roll part under such a mounted state of the device that the roll part of the mounted device has a proximal roll side and the distal roll side opposed to the proximal roll side, the proximal roll side being located proximally with respect to a device-mount plane, the distal roll side being located distally with respect to the device-mount plane. The term "proximal roll side" as used herein means a half-side of the roll part positioned more proximally with respect to the device-mount plane than the other half-side under such an assumption that the roll part is divided into two halves by a plane parallel to the device-mount plane. The proximal roll side corresponds to the lower-half portion of the body of the roll part as shown in FIG. 6. While on the other hand, term "distal roll side" as used herein means a half-side of the roll part positioned more distally with respect to the device-mount plane than the other half-side under such an assumption that the roll part is divided into two halves by a plane parallel to the device-mount plane. The distal roll side corresponds to the upper-half portion of the body of the roll part as shown in FIG. 6.

The magnet screen device of the present invention has the rolling up or down of the screen sheet from the "distal" side with respect to the device-mount plane. In contrast, the magnet screen device of the prior art has the rolling up or down of the screen sheet from the "proximal" side with respect to the device-mount plane. Such distinction between the present invention and the prior art can be clearly shown in FIGS. 4 and 5.

From another viewpoint, the magnet screen device of the present invention has a starting point for the rolling up or down of the screen sheet on the front side of the device, i.e., at the side of user or at the side of screen viewer. More specifically, the starting point for rolling up or down of the screen sheet is provided above the upper half of the roll part under such a mounted state of the device that the magnet screen device is positioned on the device-mount plane with the roll part of the device being located above the device-mount plane whereas the device-mount plane being located below the roll part. The term "starting point for rolling down of the screen sheet" used herein means a separation point of the rolled down screen sheet being away from the roll part when the screen device is used (especially when the screen device with no elongated part 30 as shown in FIG. 3 is used). While on the other hand, the term "starting point for rolling up of the screen sheet" used herein means a merging point of the rolled up screen sheet with the roll part after the screen device is used (especially after the screen device with no elongated part 30 as shown in FIG. 3 is used).

As such, the magnet screen device of the present invention has the starting point for the rolling up or down of the screen sheet at the front side of the device, i.e., at the side of user or at the side of screen viewer. In contrast, the magnet screen device of the prior art has the starting point for the rolling up or down of the screen sheet at the back side of the device, i.e., at the side of mount plane.

Now, the recognition of those skilled in the art at the time of the filing of this application will be described. In the prior art, those skilled in the art have such preconceptions that the projection surface of the screen sheet, which is the front surface of the sheet, must be kept clean with no damage since such surface serves to display an image. In other words, according to the recognition of those skilled in the art who keep the projection surface clean with no exposure thereof, the screen sheet is by necessity kept in a rolled-up position such that the projection surface is situated on the inside with respect to the magnet surface. As a result of extensive studies by the inventors, they have found that the screen sheet can be substantially kept clean with no damage thereof even when the projection surface is situated on the outside with respect to the magnet surface in the rolled-up position of the screen sheet, and that such rolling-up position of the screen sheet can effectively prevent the curling from occurring at the longitudinal edges of the sheet.

The present invention does not have an intention to exclude or eliminate the retained rolled-up shape of the screen sheet, but have such a reverse conception that the retained rolled-up shape is positively utilized to prevent the occurrence of the curling. As for the magnet screen device of the prior art, the reduction in the spring force of the spring roll (i.e., the reduction in the rotation force of roll part in the direction of rolling-up) is needed to suppress the retained rolling-up shape of the screen sheet. However, the reduction of the spring force can impair the smoothness of the rolling up of the screen sheet when the device is used. This means that the magnet screen device of the prior art requires a precise adjustment between "suppression of the retained shape" and "satisfactory force of rolling-up". Such adjustment is practically hard, and thus those skilled in the art tend to put emphasis on the "satisfactory force of rolling-up".

This means that the "suppression of the retained shape" had not been effectively addressed in the prior art, which leads to the occurrence of the curling. In this regard, the present invention requires no adjustment between "suppression of the retained shape" and "satisfactory force of rolling-up" wherein the emphasis on "satisfactory force of rolling-up" does not cause no significantly adverse effect. The reason for this is that the emphasis on "satisfactory force of rolling-up" according to the present invention allows the force generated at the longitudinal edges of the sheet to be greatly oriented toward the wall surface, which suitably promotes the sticking of the screen sheet to the mount plane. In other words, even if the spring force of the spring roll (i.e., rotation force of roll part in the direction of rolling-up) is made larger, the screen sheet according to the present invention can be suitably kept with its extended state with no "curling" occurring.

From another viewpoint, even in a case where the retained rolled-up shape of the screen sheet becomes larger, such larger shape results in an effective prevention of the occurrence of the curling, which leads to a satisfactory long term stability of the screen sheet. This means that, even if the screen sheet is kept in the rolled-up position for a prolonged period, the rolled down and extended screen sheet can be suitably held with no occurrence of the curling. The magnet screen device of the present invention can have an effect of a satisfactory operability, i.e., satisfactory smoothness of the rolling up of the screen sheet due to "satisfactory force of rolling-up", while providing the satisfactory long term stability of the screen sheet.

(Specific Embodiment of Magnet Screen Device of Present Invention)

With reference to FIGS. 8-11, the magnet screen device according to more specific embodiment will be now described.

The exterior appearance and the internal structure of the magnet screen device according to an embodiment of the present invention are shown in FIGS. 8-11. The magnet screen device as shown in FIGS. 8-11 is a portable device. That is, such magnet screen device is easy to carry around as a whole.

Figure 10:
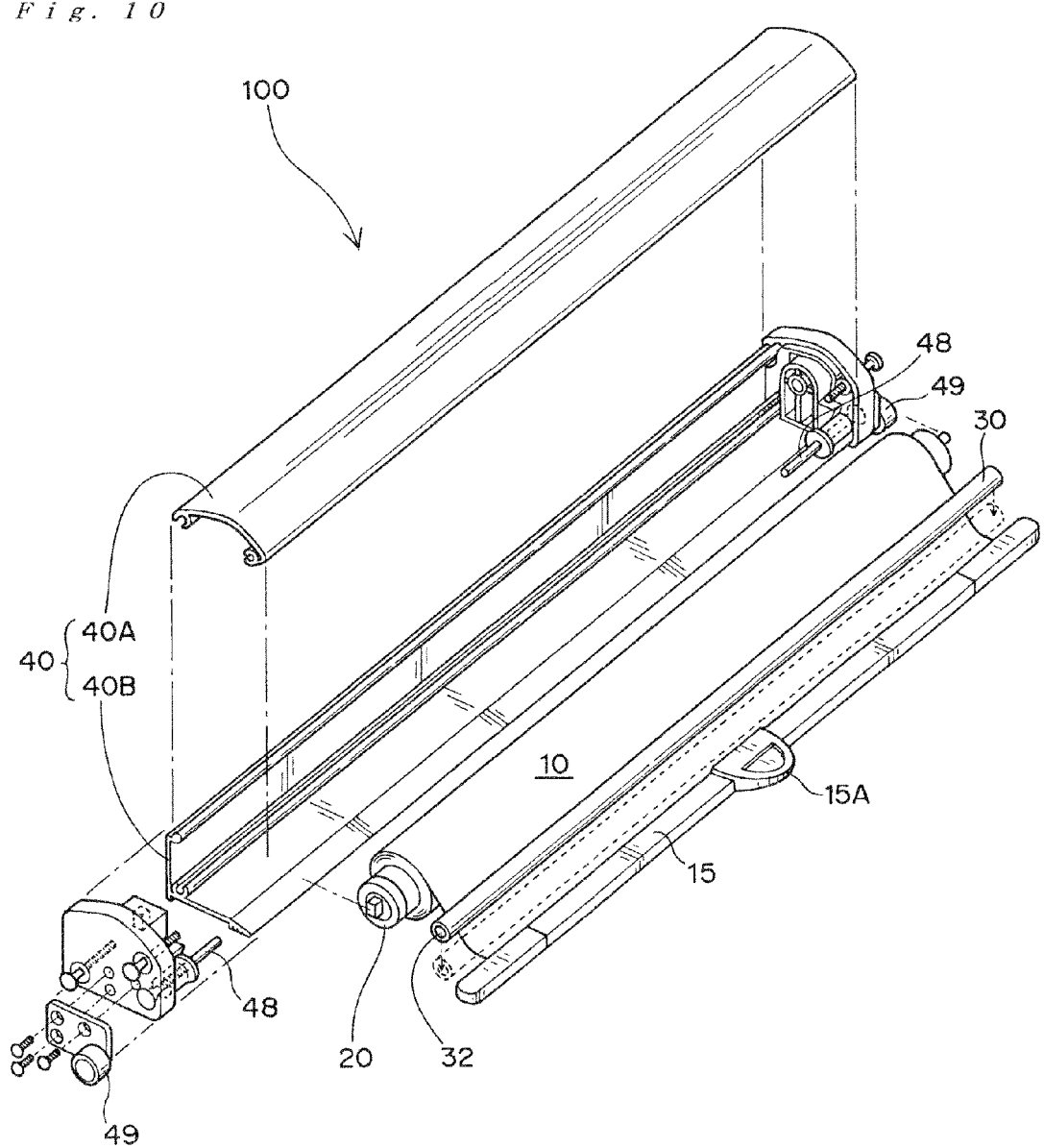
FIG. 10 is an exploded view of the magnet screen device according to an embodiment of the present invention.

As can been seen from the figures showing the magnet screen device 100 of the present invention, the screen sheet 10, the roll part 20 and the elongated part 30 are provided in a casing 40. More specifically, the screen sheet 10, which is in the rolled-up position on the roll part 20, is housed in the casing 40, and also the elongated part 30 is similarly housed in the casing while being adjacent to the rolled-up screen sheet 10. The casing 40 has an elongated form as a whole, and may be composed of two parts as shown in FIG. 10 for example. In this regard, the casing 40 is composed of "first sub-casing 40A" and "second sub-casing 40B".

Figure 8:
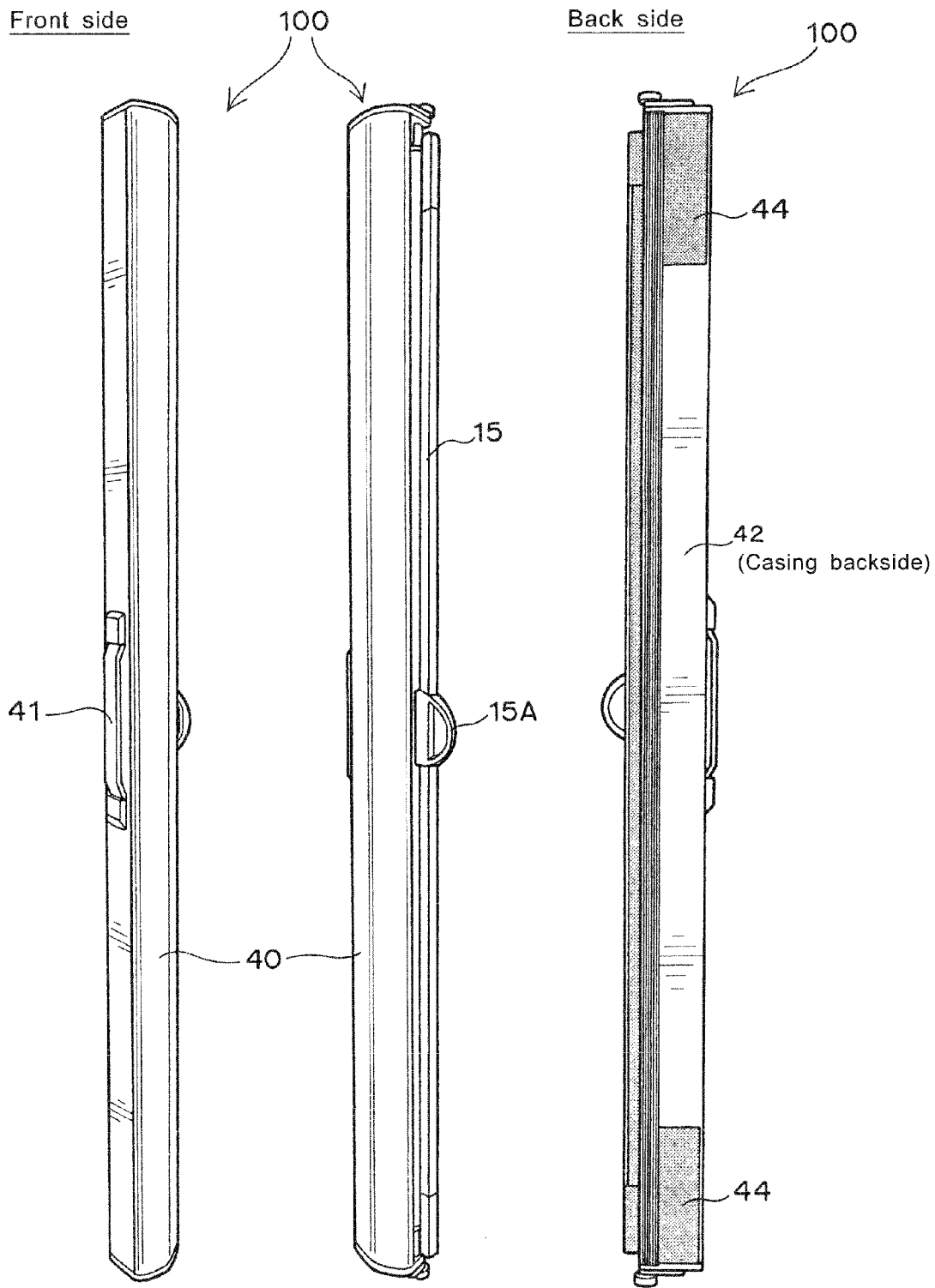
FIG. 8 is a schematic view of an exterior appearance of the magnet screen device according to an embodiment of the present invention.
Figure 9:
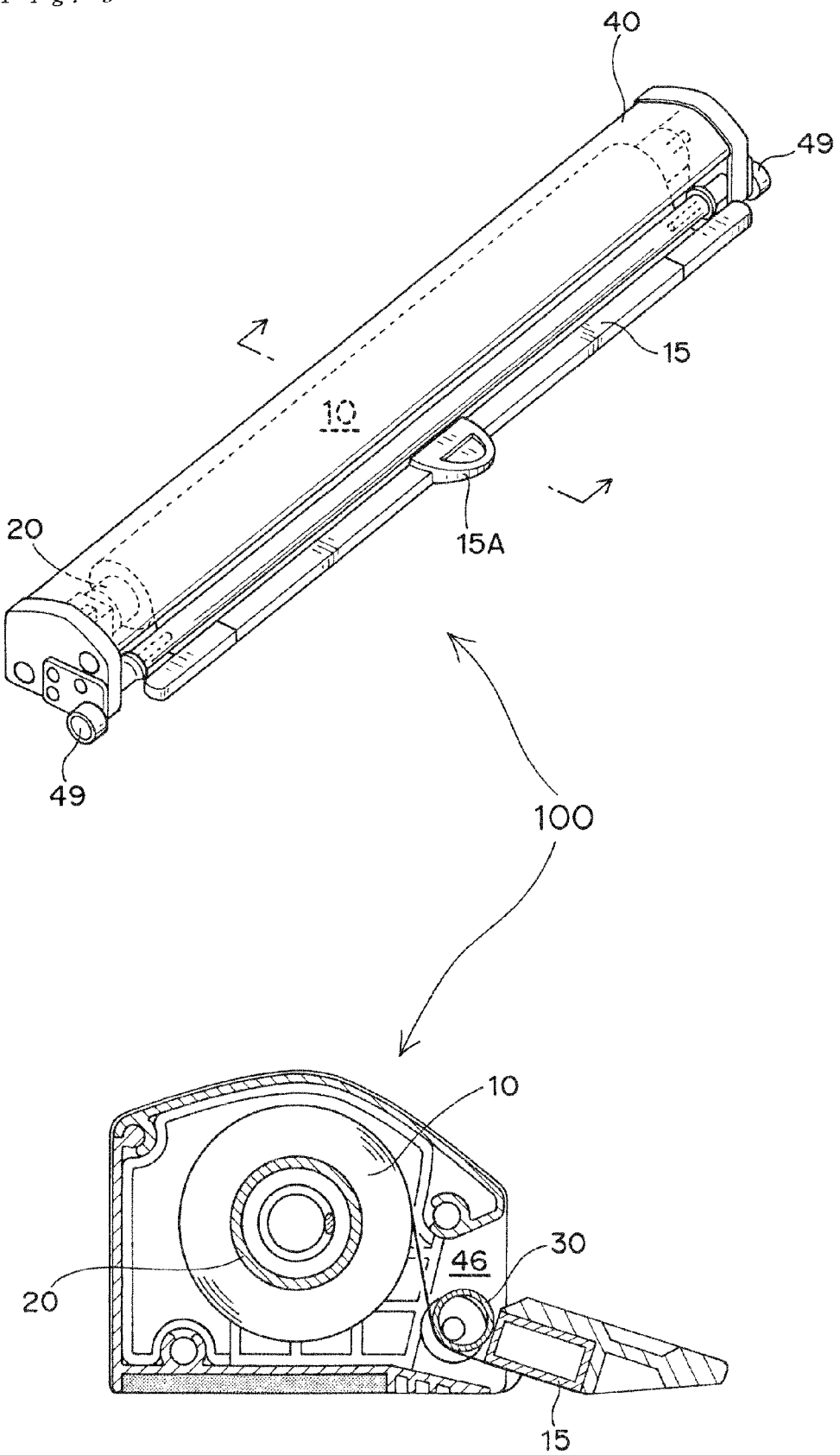
FIG. 9 is perspective and transparent views of the structure of the magnet screen device according to an embodiment of the present invention.

Due to "portable device", the casing 40 is provided with a handgrip 41 (see FIG. 8). The user can carry around the magnet screen device by use of the handgrip 41. The user can also mount the magnet screen device 100 onto the mount plane (especially "vertical plane") by use of the handgrip 41. The magnet screen device 100 is mounted so that the back face 42 thereof (see FIG. 8) makes contact with the mount plane. The back face 42 is provided with a casing magnet 44 as shown in FIG. 8, and thus the magnetic force of the casing magnet 44 can be utilized for the mounting of the device onto the wall plane.

The roll part 20 may be a spring roll. As can been seen from the figures, the edges of the roll part 20 are respectively attached to the internal wall of the casing 40 so that the rotation force of the roll part 20 is suitably exerted.

Figure 11:
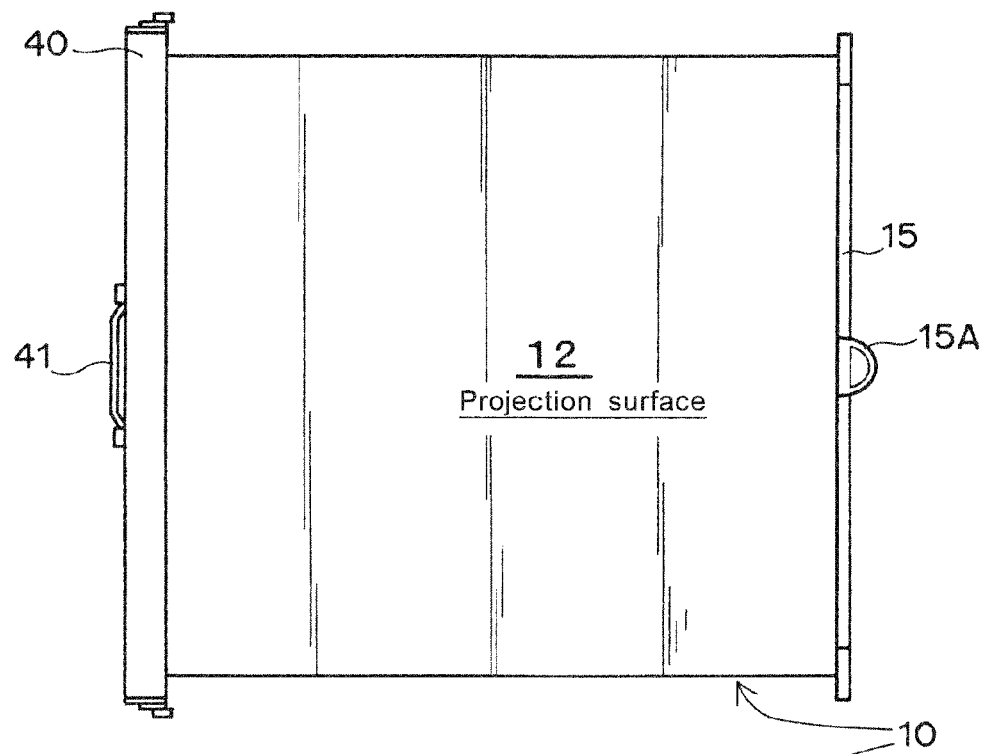
FIG. 11 is plan views showing the extended screen sheet of the magnet screen device according to an embodiment of the present invention.
Figure 11:
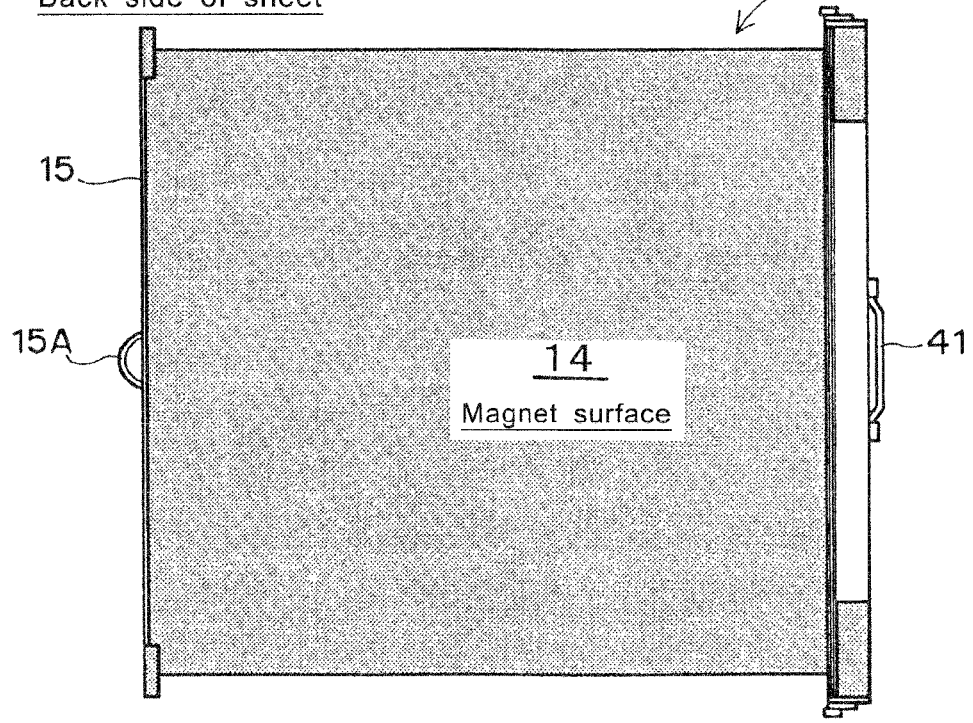

Especially as shown in FIG. 11, the screen sheet 10 has a projection surface at the front side, and a magnet surface at the back side. In other words, the resin layer 12 is provided at the front side of the screen sheet, whereas the magnet layer 14 is provided at the back side of the screen sheet. The shorter edge of the screen sheet is provided with an operating bar 15. The user can more suitably perform the rolling up or down of the screen sheet 10 by use of the operating bar 15.

As can been seen from the figures (especially from the sectional view of FIG. 9), the elongated part 30 is positioned at an opening 46 of the casing 40. More specifically, the elongated part 30 is positioned at the casing opening 46 so that the rolling up or down of the screen sheet is suitably performed. In other words, the elongated part 30 is positioned on the inner side of the opening 46 such that a longitudinal axis of the elongated part 20 and a longitudinal axis of the slit-like casing opening 46 are in an alignment with each other. As such, the elongated part 30 serves to put a local pressure onto the rolled-up or down screen sheet 10 when the device is used.

The elongated part 30 may be made of metal. It is preferred that the elongated part 30 has a hollow structure (see FIG. 10). In a case of the elongated part with the hollow structure, there is preferably provided a hollow portion 32 extending in the axis direction of the elongated part (i.e., along the longitudinal axis of the elongated part), in which case the hollow portion 32 of the elongated part is preferably positioned at a boss 48 provided in the casing. This allows the elongated part 30 to be suitably rotated. In this regard, the elongated part 30 is rotatable due to a sliding contact of the rolled up or down screen sheet 10 with the elongated part 30. In particular, the elongated part 30 is rotatable about the longitudinal axis thereof. The rotation of the elongated part 30 due to the sliding makes it possible to reduce the friction resistance of the elongated part, the friction resistance being attributed to the pressing of the rolled-up or down sheet toward the mount plane. The reduction of such friction resistance can lead to a more satisfactory smoothness for the rolling up of the screen sheet when the magnet screen device is used.

(Use Embodiment of Screen Device)

Figure 12:
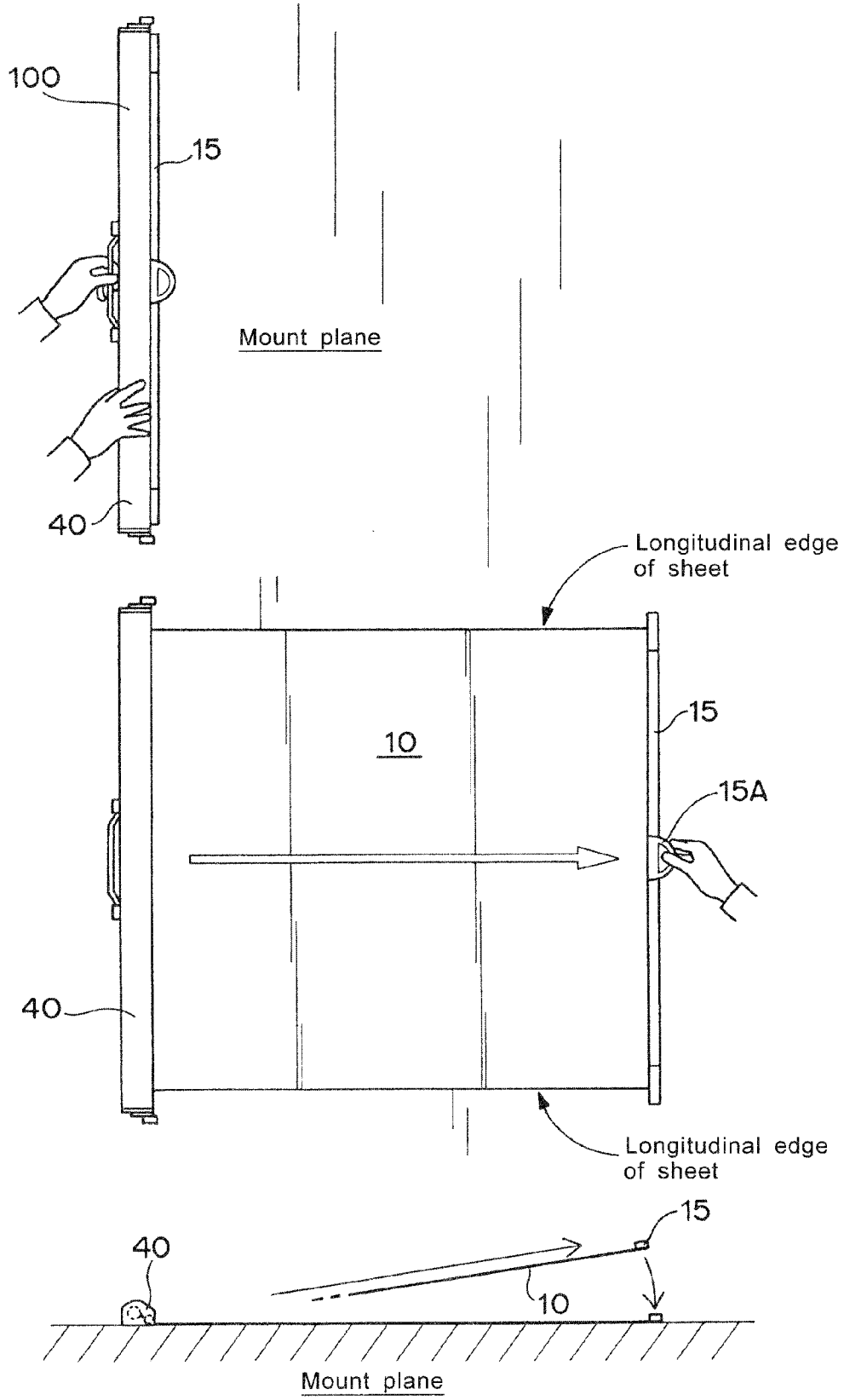
FIG. 12 is schematic views of the use of the magnet screen device according to an embodiment of the present invention, showing that the screen sheet is directly rolled down to be extended.
Figure 13:
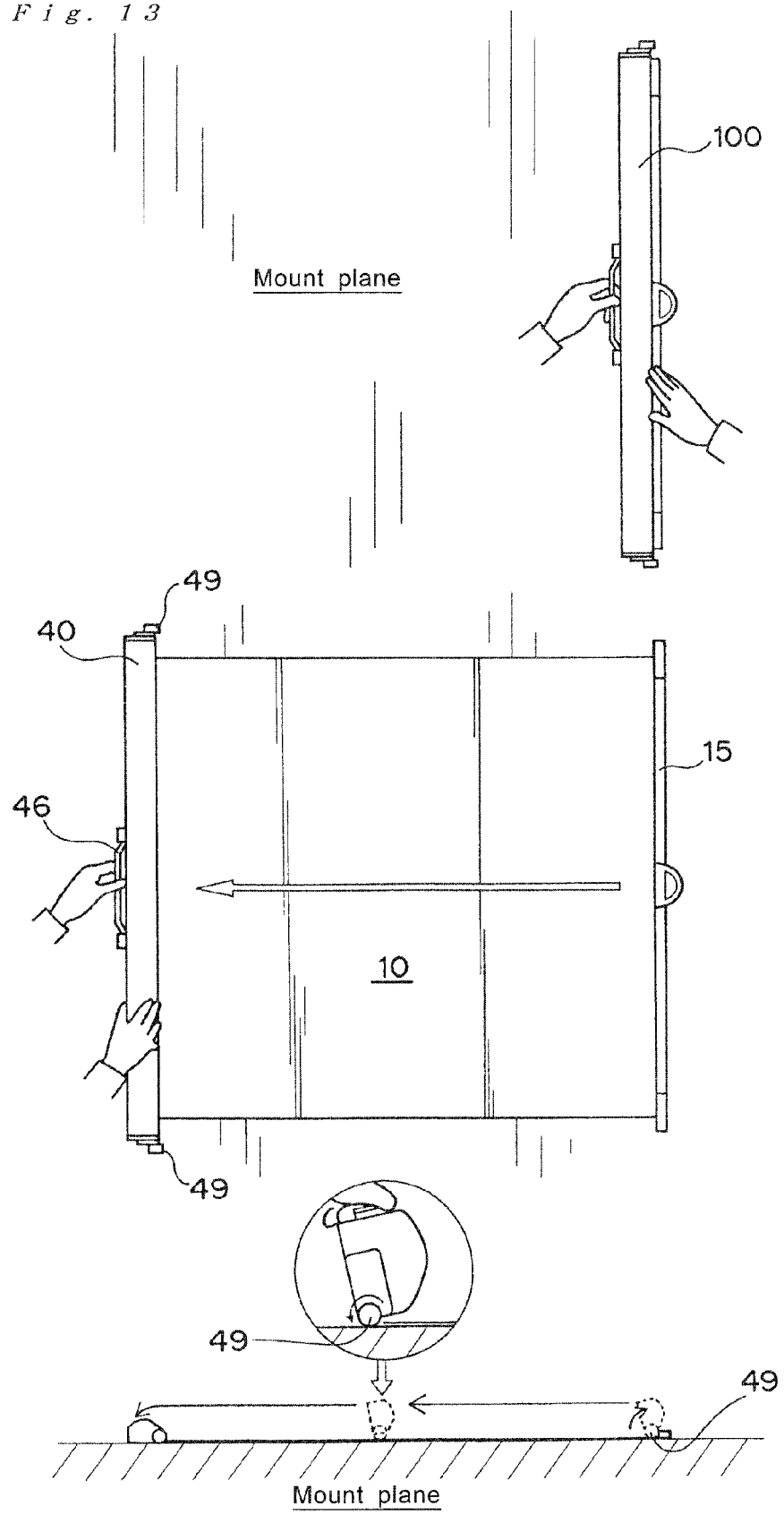
FIG. 13 is schematic views of the use of the magnet screen device according to an embodiment of the present invention, showing the slide movement of the casing.

With reference to FIGS. 12 and 13, the use embodiment of the magnet screen device according to the present invention will be now described. The use embodiment can be classified as "Direct Rolling-up of Screen Sheet" (FIG. 12) and "Sliding of Casing" (FIG. 13).

With respect to "Direct Rolling-up of Screen Sheet" as shown in FIG. 12, the magnet screen device 100 is mounted onto the mount plane (i.e., the plane to which a magnet can be attached by magnetic force), and thereafter the operating bar 15 is moved away from the casing 40. More specifically, a handle 15A of the operating bar 15 is used to move the operating bar 15 in the direction of the rolling down of the screen sheet 10. That is, the handle 15A of the operating bar 15 is used to roll down the screen sheet 10. After the desired length of the rolled down sheet is provided, the operating bar 15 is placed onto the mount plane. Because of the existence of a magnet provided on the back face of the operating bar, the operating bar 15 can be suitably held on the mount plane. Moreover, because of the magnet surface at the back of the screen sheet 10, the extended screen sheet can be suitably held on the mount plane. As can been seen from FIG. 12 showing the magnet screen device of the present invention, the rolled down and extended screen sheet 10 can be wholly held on the device-mount plane with the edges of the sheet (especially "longitudinal edges of the sheet") being taut.

With respect to "Sliding of Casing" as shown in FIG. 13, the magnet screen device 100 is mounted onto the mount plane (i.e., the plane to which the magnet can be attached by magnetic force), and thereafter the casing 40 is moved while keeping the operating bar 15 on the mount plane. More specifically, the casing 40 is forced to slide along the mount plane while keeping the operating bar 15 on the mount plane, and thereby the rolling down of the screen sheet 10 is performed. In this regard, the casing 40 is preferably provided with a roller 49 (see FIGS. 9 and 10 as well as FIG. 13), and thereby a suitable sliding of the casing on the mount plane can be performed due to the rotation of the roller. After the desired length of the rolled down sheet is provided, the casing 40 is placed onto the mount plane. Because of the existence of a magnet provided on the back face 42 of the casing (the magnet being indicated by reference numeral "44" in FIG. 8), the casing 40 can be suitably held on the mount plane. Moreover, because of the magnet surface at the back of the screen sheet 10, the extended screen sheet can be suitably held on the mount plane. As can been seen from FIG. 13 showing the magnet screen device of the present invention, the rolled down and extended screen sheet 10 can be wholly held on the device-mount plane with the edges of the sheet (especially "longitudinal edges of the sheet") being taut.

It should be noted that the present invention as described above includes the following aspects:

The first aspect: A magnet screen device comprising:
- a screen sheet having a projection surface and a magnet surface opposed to the projection surface; and
- a roll part for rolling up the screen sheet,
- wherein, in non-use state of the device, the screen sheet is in a rolled-up position on the roll part such that the magnet surface is positioned/located on the inside with respect to the projection surface.

The second aspect: The magnet screen device according to the first aspect, wherein the screen sheet is rolled up or down at a distal roll side of the roll part under such a mounted state of the device that the roll part of the mounted device has a proximal roll side and the distal roll side opposed to the proximal roll side, the proximal roll side being located proximally with respect to a device-mount plane, the distal roll side being located distally with respect to the device-mount plane.

The third aspect: The magnet screen device according to the first or second aspect, wherein a point for rolling up or down of the screen sheet is above the upper half of the roll part under such a mounted state of the device that the magnet screen device is positioned on the device-mount plane with the roll part of the device being located above the device-mount plane whereas the device-mount plane being located below the roll part.

The fourth aspect: The magnet screen device according to any one of the first to third aspects, further comprising an elongated part capable of making contact with the screen sheet upon rolling up or down of the screen sheet, and
- wherein the elongated part makes direct contact with the projection surface of the rolled-up or down screen sheet.

The fifth aspect: The magnet screen device according to the fourth aspect, wherein the elongated part is rotatable due to a sliding contact of the rolled up or down screen sheet with the elongated part.

The sixth aspect: The magnet screen device according to the fourth or fifth aspect, wherein the elongated part has a hollow structure.

The seventh aspect: The magnet screen device according to any one of the fourth to sixth aspects, further comprising a casing for housing the screen sheet and the roll part,
- wherein the casing has an opening for the rolling up or down of the screen sheet, and
- wherein the elongated part is positioned at the opening.

The eighth aspect: The magnet screen device according to any one of the first to seventh aspects, wherein the screen sheet is at least composed of a resin layer and a magnet layer, and
- wherein, in non-use state of the device, the screen sheet is in a rolled-up position on the roll part such that the magnet layer is situated on the inside with respect to the resin layer.

The ninth aspect: The magnet screen device according to any one of the first to eighth aspects, wherein the magnet screen device is a portable device.

The tenth aspect: The magnet screen device according to any one of the first to ninth aspects, wherein the roll part is a spring roll.

Although a few embodiments of the present invention have been hereinbefore described, the present invention is not limited to these embodiments. The embodiments described above are merely for illustrative purposes. It will be readily appreciated by those skilled in the art that various modifications are possible without departing from the scope of the present invention. For example, the following modified embodiments are possible.

The magnet screen device of the present invention is not limited to one with the spring roll as shown in FIGS. 8-11. The roll part in the present invention may be an electrically-operated one. That is, the scope of the present invention includes a magnet screen device equipped with the electrically-operated roll part whose rotation is electrically driven to roll up or down the screen sheet.

Moreover, the magnet screen device of the present invention is not limited to the portable one as shown in FIGS. 8-11 wherein the magnet screen device as a whole is easy to carry around. The magnet screen device of the present invention may be stationary one which is secured to or suspended from a wall surface or ceiling surface. The magnet screen device of the present invention may also be stand-alone one with floor-type.

Moreover, the magnet screen device of the present invention is not limited to one with the screen sheet as shown in FIGS. 8-11 wherein the magnet layer is widely provided in the whole principal surface of the sheet. According to the present invention, the force generated at the longitudinal edges of the sheet is oriented toward the wall surface (i.e., vertical surface), i.e., in the wall-pressing direction, and thus no magnet may be provided at the longitudinal edges of the sheet. That is, the present invention makes it possible to locally reduce the magnet area of the screen sheet, which leads to a more flexible and/or light-weight screen device.

INDUSTRIAL APPLICABILITY

The magnet screen device of the present invention can be used as a screen which displays magnified images projected from various projectors. In particular, the magnet screen device of the present invention can be suitably available for short focal-type projectors (i.e., "short focal-length projector" and "extremely short focal-length projector") since the extended screen sheet can be wholly held on the device-mount plane with the edges of the sheet being uniformly taut.

CROSS REFERENCE TO RELATED PATENT APPLICATION

The present application claims the right of priority of Japan patent application No. 2015-47415 (filing date: Mar. 10, 2015, title of the invention: MAGNET SCREEN DEVICE), the whole contents of which are incorporated herein by reference.

BRIEF EXPLANATION OF REFERENCE NUMERALS

Present Invention
10 Screen sheet
12 Resin layer of screen sheet (i.e., layer having projection surface of the screen sheet)
14 Magnet layer of screen sheet (i.e., layer having magnet surface of the screen sheet)
15 Operating bar
15A Handle provided in operating bar
20 Roll part
30 Elongated part
40 Casing
40A First sub-casing of casing
40B Second sub-casing of casing
41 Handgrip
42 Back side
44 Casing magnet
46 Opening of casing
48 Boss provided in casing
49 Roller
100 Magnet screen device
Prior Art
10' Screen sheet of magnet screen device according to the prior art
12' Resin layer of screen sheet (i.e., layer having projection surface of the screen sheet) of magnet screen device according to the prior art
14' Magnet layer of screen sheet (i.e., layer having magnet surface of the screen sheet) of magnet screen device according to the prior art
100' Magnet screen device according to the prior art

The invention claimed is:

1. A magnet screen device comprising:
a screen sheet having a projection surface and a magnet surface opposed to the projection surface; and
a roll part for rolling up the screen sheet,
wherein, in non-use state of the device, the screen sheet is in a rolled-up position on the roll part such that the magnet surface is situated on the inside with respect to the projection surface; and
wherein the roll part has a proximal roll side and a distal roll side opposed to the proximal roll side, the proximal roll side being located proximally with respect to a device-mount plane, the distal roll side being located distally with respect to the device-mount plane, and wherein the screen sheet is rolled up or down from the distal roll side of the roll part in such a mounted state of the device.

2. The magnet screen device according to claim 1, wherein a starting point for rolling up or down of the screen sheet is above the upper half of the roll part in the mounted state of the device such that the magnet screen device is positioned on the device-mount plane with the roll part of the device being located above the device-mount plane whereas the device-mount plane being located below the roll part.

3. The magnet screen device according to claim 1, further comprising an elongated part capable of making contact with the screen sheet upon rolling up or down of the screen sheet, and
wherein the elongated part makes direct contact with the projection surface of the rolled-up or down screen sheet.

4. The magnet screen device according to claim 3, wherein the elongated part is rotatable due to a sliding contact of the rolled up or down screen sheet with the elongated part.

5. The magnet screen device according to claim 3, wherein the elongated part has a hollow structure.

6. The magnet screen device according to claim 3, further comprising a casing for housing the screen sheet and the roll part,
wherein the casing has an opening for the rolling up or down of the screen sheet, and
wherein the elongated part is positioned at the opening.

7. The magnet screen device according to claim 1, wherein the screen sheet is at least composed of a resin layer and a magnet layer, and
wherein, in the non-use state of the device, the screen sheet is in the rolled-up position on the roll part such that the magnet layer is situated on the inside with respect to the resin layer.

8. The magnet screen device according to claim 1, wherein the magnet screen device is a portable device.

9. The magnet screen device according to claim 1, wherein the roll part is a spring roll.

10. The magnet screen device according to claim 1, wherein
the screen sheet comprises a first longitudinal edge and a second longitudinal edge opposite the first longitudinal edge, at least a portion of the first longitudinal edge and of the second longitudinal edge rolled around the roll part in the rolled-up position, and
the magnet surface of the screen sheet extends from the first longitudinal edge to the second longitudinal edge.

* * * * *